US010786878B2

(12) United States Patent
Cui et al.

(10) Patent No.: US 10,786,878 B2
(45) Date of Patent: Sep. 29, 2020

(54) METHOD OF WELDING WITH BUTTERING

(71) Applicant: GENERAL ELECTRIC COMPANY, Schenectady, NY (US)

(72) Inventors: Yan Cui, Greer, SC (US); Srikanth Chandrudu Kottilingam, Greenville, SC (US); Brian Lee Tollison, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 365 days.

(21) Appl. No.: 15/657,921

(22) Filed: Jul. 24, 2017

(65) Prior Publication Data

US 2019/0022802 A1    Jan. 24, 2019

(51) Int. Cl.
| | | |
|---|---|---|
| *B23P 6/00* | (2006.01) | |
| *B23K 9/23* | (2006.01) | |
| *B23K 9/04* | (2006.01) | |
| *B23K 101/00* | (2006.01) | |

(52) U.S. Cl.
CPC .............. *B23P 6/007* (2013.01); *B23K 9/046* (2013.01); *B23K 9/23* (2013.01); *B23K 2101/001* (2018.08)

(58) Field of Classification Search
CPC .............................................. C22C 19/055–57
USPC ........................................................ 228/119
See application file for complete search history.

(56) References Cited

U.S. PATENT DOCUMENTS

| | | | | |
|---|---|---|---|---|
| 6,478,897 | B1 * | 11/2002 | Izumida ................ | C22C 19/055 148/428 |
| 6,491,207 | B1 * | 12/2002 | Smashey ................ | B23K 31/02 228/119 |
| 7,591,410 | B2 * | 9/2009 | Coleman .............. | B23K 35/004 228/225 |
| 7,653,995 | B2 * | 2/2010 | Morin .................... | B23K 31/02 29/889.1 |
| 8,561,298 | B2 * | 10/2013 | Morin ...................... | C22F 1/10 29/889.21 |
| 9,528,175 | B2 * | 12/2016 | Angal ....................... | C22F 1/10 |
| 9,541,281 | B2 * | 1/2017 | Imano .................... | F22B 37/04 |

(Continued)

OTHER PUBLICATIONS

Hsu et al., "Effects of the Hot Isostatic Pressing Process on Crack Healing of the Laser Repair-Welded CM247LC Superalloy"; Metals 2016, 6, 238; p. 1-9 (Year: 2016).*

(Continued)

*Primary Examiner* — Erin B Saad
*Assistant Examiner* — Carlos J Gamino
(74) *Attorney, Agent, or Firm* — McNees Wallace & Nurick LLC

(57) ABSTRACT

A method of welding a component and a treated component are provided. The method comprises an initial heat-treating of the component comprising a substrate. The method further comprises removing a portion of the substrate to form a treatment region comprising an exposed surface. The method further comprises buttering the exposed surface with a first filler additive to form a weld metal adjacent to the fusion line comprising an easy-to-weld alloy. The method further comprises welding the component with the easy-to-weld alloy and a second filler additive. The first filler additive comprises a sufficient amount of each of Co, Cr, Mo, Fe, Al, Ti, Mn, C and Ni to form the easy-to-weld alloy, when welded with the hard-to-weld base alloy.

18 Claims, 2 Drawing Sheets

(56) References Cited

U.S. PATENT DOCUMENTS

| | | | | |
|---|---|---|---|---|
| 2006/0060640 | A1* | 3/2006 | Pao | B23K 35/322 228/254 |
| 2007/0221705 | A1* | 9/2007 | Arnett | B23K 31/02 228/101 |
| 2011/0052401 | A1* | 3/2011 | Scarlin | B23K 31/12 416/223 R |
| 2013/0295302 | A1* | 11/2013 | Godon | D03D 3/00 428/34.1 |
| 2015/0129644 | A1* | 5/2015 | Cui | B23K 35/3033 228/101 |
| 2015/0167129 | A1* | 6/2015 | DiDomizio | C22C 32/001 428/34.1 |
| 2015/0354031 | A1* | 12/2015 | Gehrmann | C22F 1/08 148/410 |
| 2016/0089719 | A1* | 3/2016 | Lacy | C23C 28/022 428/557 |
| 2016/0326613 | A1* | 11/2016 | Cui | C22C 19/055 |

OTHER PUBLICATIONS

Huang et al., "Characteristics and Mechanical Properties of Polycrystalline CM 247 LC Superalloy Casting", Materials Transactions, vol. 45, No. 2 (2004) pp. 562 to 568 (Year: 2004).*

* cited by examiner

METHOD OF WELDING WITH BUTTERING

FIELD OF THE INVENTION

The present invention is generally directed to a treated component and a method of welding a component. More specifically, the present invention is directed to a treated gas turbine component comprising a hard-to-weld alloy and a method of welding hard-to-weld alloy via a buttering process.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components, such as combustors, combustion liners, combustion transition pieces, combustion hardware, blades (buckets), vanes (nozzles) and shrouds, is important in commercial gas turbine engines.

High gamma prime content alloys have been largely used in gas turbine industry due to their excellent mechanical properties, oxidization resistance and corrosion resistance. They, however, have poor weldability due to a tendency for liquation cracking and strain age cracking (SAC). Due to the poor weldability of Rene 108, weld filler materials have been usually selected to sacrifice mechanical properties to meet weldability requirements. For the current engineering practice, however, it is still difficult to obtain a crack-free fusion zone.

BRIEF SUMMARY OF THE INVENTION

In an exemplary embodiment, a method of welding a component is provided. The method comprises an initial heat-treating of the component comprising a substrate. The substrate comprises a hard-to-weld base alloy. The initial heat-treating forming substantially equiaxed gamma prime microstructure has an average gamma prime grain size greater than prior to the initial heat-treating. The method further comprises removing a portion of the substrate to form a treatment region comprising an exposed surface. The method further comprises buttering the exposed surface with a first filler additive to form a weld metal adjacent to the fusion line comprising an easy-to-weld alloy. The method further comprises welding the component with the easy-to-weld alloy and a second filler additive. The first filler additive comprises a sufficient amount of each of Co, Cr, Mo, Fe, Al, Ti, Mn, C and Ni to form the easy-to-weld alloy, when welded with the hard-to-weld base alloy.

In another exemplary embodiment, a treated component is provided. The treated component comprises a substrate comprising a hard-to-weld base alloy. The treated further comprises a treatment region abutting the substrate. The treatment region comprises a weld metal adjacent to the fusion line comprising an easy-to-weld alloy formed by buttering the hard-to-weld base alloy and a first filler additive, and a second filler additive.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
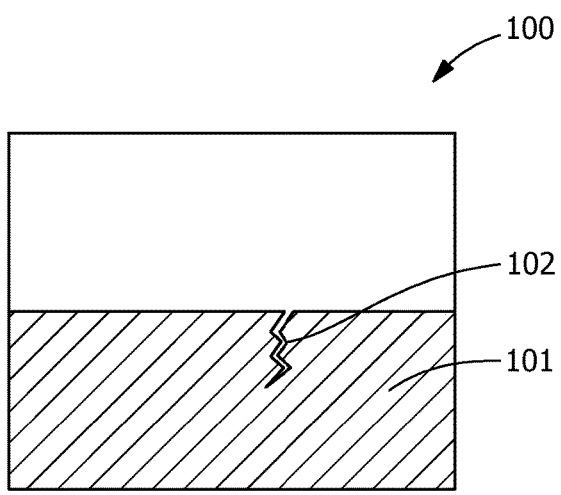
FIG. 1 illustrates a gas turbine component including a defect, according to an embodiment of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are an exemplary method of welding a component and a treated component. Embodiments of the present disclosure, in comparison to components and method not utilizing one or more features disclosed herein, enable the formation of crack-free components.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

The term "hard-to-weld alloy (and its variations)", as used herein, means an alloy, having Al %>−½ Ti %+3, where Al % is weight percent of aluminum and Ti % is weight percent of titanium.

The term "easy-to-weld alloy (and its variations)", as used herein, means an alloy, having Al %≤−½ Ti %+3, where Al % is weight percent of aluminum and Ti % is weight percent of titanium.

The term "buttering", as used herein, means a process of applying a weld filler additive to a hard-to-weld alloy to be transformed into an easy-to-weld alloy so that additional easy-to-weld or hard-to-weld alloy can be deposited onto the easy-to-weld alloy.

With reference to FIG. 1, a gas turbine component 100 including a substrate 101 is provided. Substrate 101 includes a defect 102. Substrate 101 includes a hard-to-weld base alloy.

In one embodiment, the hard-to-weld base alloy comprises, by weight, about 9.3-9.7% tungsten, about 9-10% cobalt, about 8.0-8.7% chromium, about 5.25-5.75% aluminum, about 2.80-3.30% of tantalum, about 0.6-0.9% titanium, about 0.4-0.6% molybdenum, about 0-0.2% of iron, about 0.01-0.02% of boron, about 0.07-0.10% of carbon and a balance of nickel.

Figure 2:
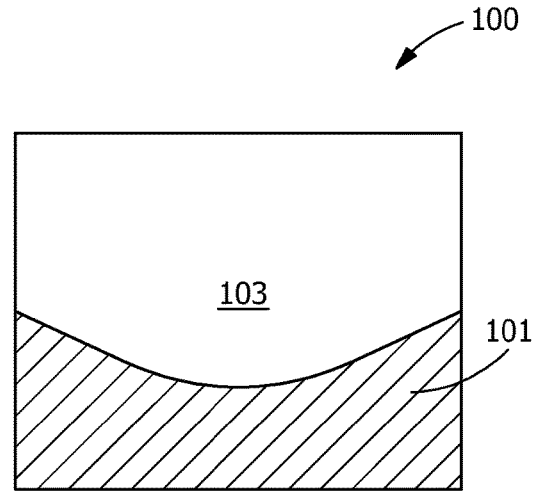
FIG. 2 illustrates a gas turbine component, wherein a portion of the gas turbine component is removed, according to an embodiment of the present disclosure.

With reference to FIG. 2, gas turbine component 100 further comprises a treatment region 103 abutting substrate 101.

Figure 3:
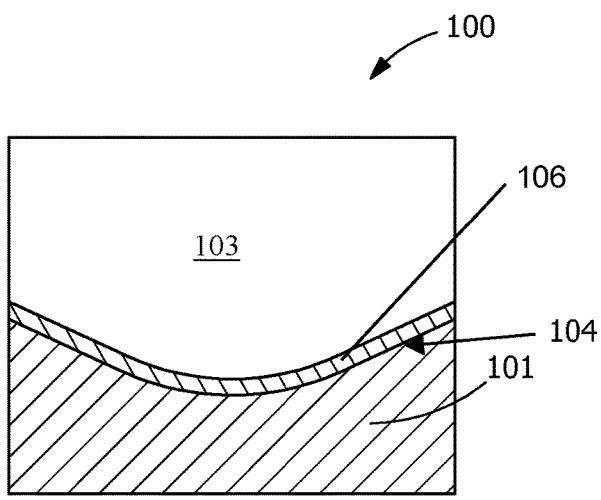
FIG. 3 illustrates a buttered gas turbine component, according to an embodiment of the present disclosure.

With reference to FIG. 3, treatment region 103 comprises a weld metal 106 adjacent to the fusion line 104 comprising an easy-to-weld alloy. Weld metal 106 adjacent to the fusion line 104 is formed by buttering the hard-to-weld base alloy 101 with a first filler additive.

In one embodiment, the first filler additive comprises, by weight, about 0.55-2.75% of titanium+aluminum alloy, about 7.0-14% of cobalt, about 9.0-16% of chromium, about 10-20% of molybdenum, about 1.0-5.0% of iron, about 0.05-0.75% of aluminum, about 0.5-2.0% of titanium, less than or equal to about 0.8% of manganese, about 0.02-0.10% of carbon and a balance of nickel, the first filler additive being devoid of hafnium.

In one embodiment, the easy-to-weld alloy comprises by weight, about 11% chromium, about 11% cobalt, about 11% molybdenum, about 3.2% tungsten, about 1.8% aluminum, about 1% titanium and a balance of nickel.

In one embodiment, the easy-to-weld alloy forming in the weld metal adjacent to the fusion line comprises gamma prime concentration similar to the second filler additive. In another embodiment, the easy-to-weld alloy comprises the same amount of gamma prime concentration as the second filler additive.

Figure 4:
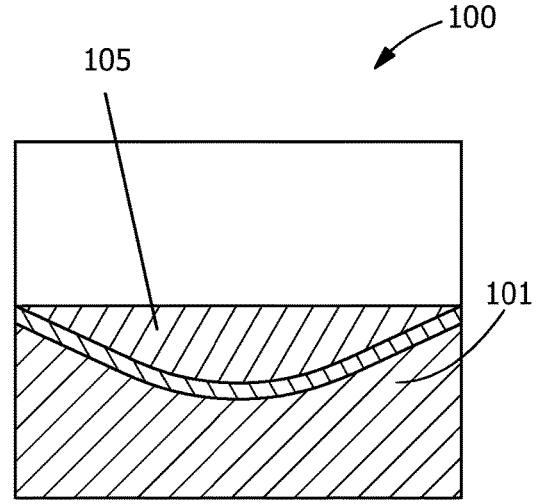
FIG. 4 illustrates a gas turbine component, wherein the removed portion is filled with a second filler additive, according to an embodiment of the present disclosure.

With reference to FIG. 4, treatment region 103 is filled with a second filler additive 105 to form treated gas turbine component.

In one embodiment, a treated gas turbine component is substantially crack-free.

In one embodiment, the second filler additive comprises, by weight, 1.8-2.2% tungsten, about 18.5-19.5% cobalt, about 22.2-22.8% chromium, about 1.6-1.8% aluminum, about 2.2-2.4% titanium, about 0.15% molybdenum, about 0.35% of iron, about 0.002-0.008% of boron, about 0.08-0.12% carbon, about 1.25-1.45% niobium and a balance of nickel.

In another embodiment, the second filler additive comprises, by weight, about 1.0-2.0% tungsten, about 18.0-20.0% cobalt, about 20.0-22.0% chromium, about 2.0-3.0% aluminum, about 0.5-1.5% titanium, about 0.5-1.5% of molybdenum, about 0.03-0.18% carbon, about 3.0-6.0% niobium, up to about 0.15% of tantalum, up to about 0.20% of hafnium, up to about 0.20% of iron, and a balance of nickel.

Figure 5:
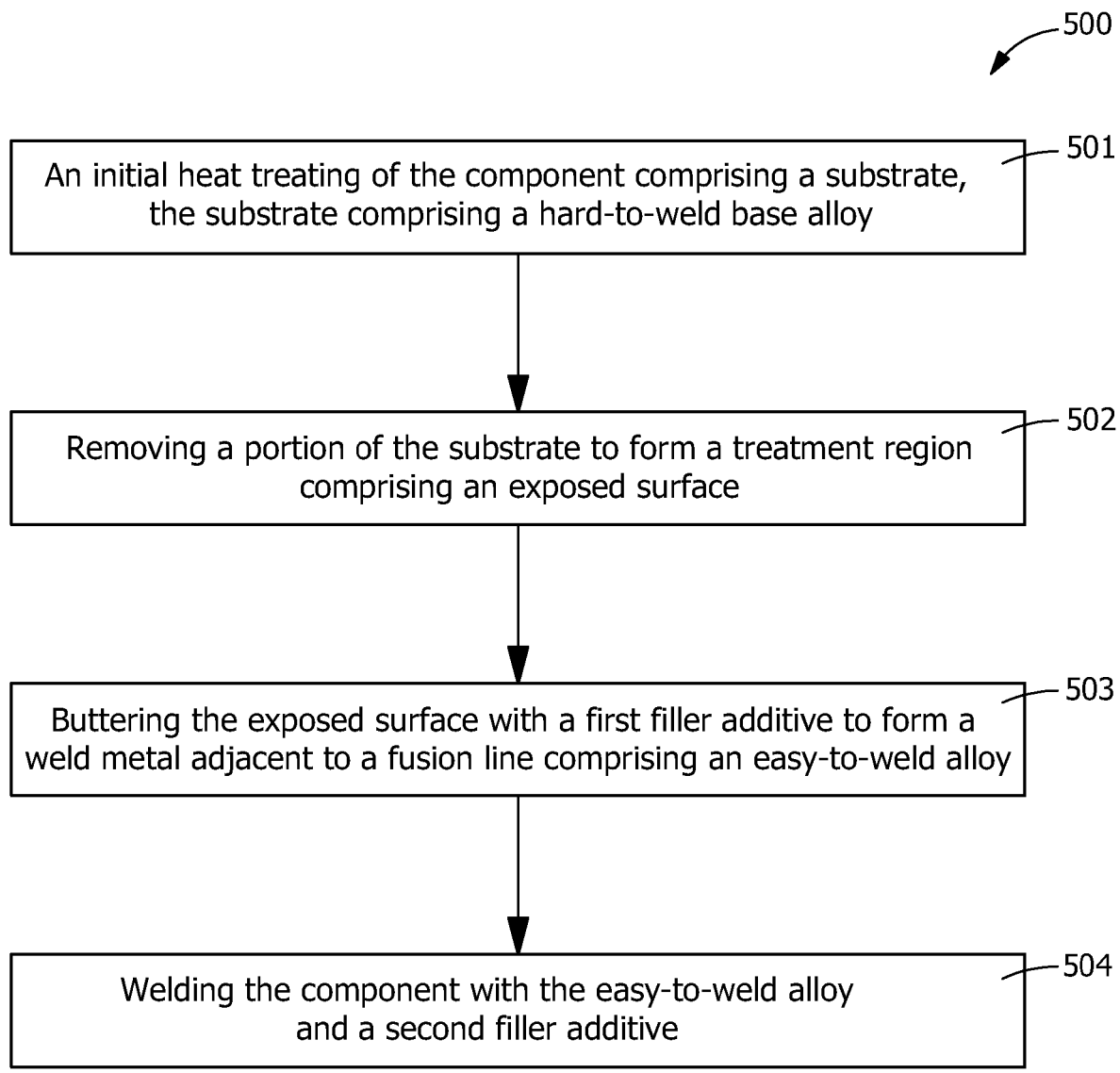
FIG. 5 is a flow chart illustrating a method of welding a treated component, according to an embodiment of the present disclosure.

With reference to FIG. 5, a method 500 of welding a gas turbine component is provided. The method 500 comprises an initial heat-treating of the component comprising a substrate (step 501). The substrate 101 comprises a hard-to-weld base alloy. The initial heat-treating forming substantially equiaxed gamma prime microstructure has an average gamma prime grain size greater than prior to the initial heat-treating. The method 500 further comprises removing a portion of the substrate 101 to form a treatment region 103 comprising an exposed surface (step 502). The method 500 further comprises buttering the exposed surface with a first filler additive to form a weld metal adjacent to the fusion line comprising an easy-to-weld alloy (step 503). The method 500 further comprises welding the component with the easy-to-weld alloy and a second filler additive (step 504). The first filler additive comprises a sufficient amount of each of Co, Cr, Mo, Fe, Al, Ti, Mn, C and Ni to form the easy-to-weld alloy, when welded with the hard-to-weld base alloy.

In one embodiment, the initial heat-treating of the component comprises increasing temperature up to 2200° F., maintaining 2200° F. for two hours, decreasing temperature at a rate of 1° F./min until 1500° F., and vacuum-quenching. The heat treatment increases gamma prime size and improve weldability.

In one embodiment, removing a portion of the substrate 101 to form a treatment region 103 comprising an exposed surface (step 502) creates U or V groove for weld repair preparation. The removed portion may include defects.

In one embodiment, method 500 further comprises a step of depositing a top layer onto the treatment region 103 filled with the second filler additive 105 (see for example FIG. 4). The top layer may or may not include the first filler additive. The deposited top layer may be removed by a process including, but not limited to, machining in order to form a smooth surface.

In one embodiment, method 500 further comprises a step of post-weld heat treating the treated component in a vacuum furnace with clamping the component with compressive fixtures.

In one embodiment, method 500 further comprises conducting fluorescent penetrant inspection and X-ray inspection to confirm no linear indication on the surface and solid weld metal inside, respectively.

In one embodiment, method 500 further comprises a step of heat-treating the treated component under hot isostatic processing (HIP) conditions in order to close inside defects, such as porosity and microfissures.

In one embodiment, method 500 further comprises a step of solution heat-treating the treated component. The solution heat treatment restores the microstructure to the final required condition. The solution heat treatment may be conducted at 2050° F. for 2 hours.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of welding a component, the method comprising:
an initial heat-treating of the component comprising a substrate, the substrate comprising a hard-to-weld base alloy, the initial heat-treating forming substantially equiaxed gamma prime microstructure having an average gamma prime grain size greater than prior to the initial heat-treating;
removing a portion of the substrate to form a treatment region comprising an exposed surface;
buttering the exposed surface with a first filler additive to form a weld metal adjacent to a fusion line comprising an easy-to-weld alloy;
welding the component with the easy-to-weld alloy and a second filler additive to form a treated component;
depositing a top layer including the first filler additive onto the second filler additive;
post-weld heat-treating the treated component; and
removing the top layer,
wherein the first filler additive comprises a sufficient amount of each of Co, Cr, Mo, Fe, Al, Ti, Mn, C and Ni to form the easy-to-weld alloy, when welded with the hard-to-weld base alloy; and
wherein the second filler additive comprises, by weight:
about 1.0-2.0% tungsten, about 18.0-20.0% cobalt, about 20.0-22.0% chromium, about 2.0-3.0% aluminum, about 0.5-1.5% titanium, about 0.5-1.5% of molybdenum, about 0.03-0.18% carbon, about 3.0-6.0% niobium, up to about 0.15% of tantalum, up to about 0.20% of hafnium, up to about 0.20% of iron, and a balance of nickel; or
1.8-2.2% tungsten, about 18.5-19.5% cobalt, about 22.2-22.8% chromium, about 1.6-1.8% aluminum, about 2.2-2.4% titanium, about 0.15% molybdenum, about 0.35% of iron, about 0.002-0.008% of boron, about 0.08-0.12% carbon, about 1.25-1.45% niobium and a balance of nickel.

2. The method according to claim 1, wherein the hard-to-weld base alloy comprises, by weight, about 9.3-9.7% tungsten, about 9-10% cobalt, about 8.0-8.7% chromium, about 5.25-5.75% aluminum, about 2.80-3.30% of tantalum, about 0.6-0.9% titanium, about 0.4-0.6% molybdenum, about 0-0.2% of iron, about 0.01-0.02% of boron, about 0.07-0.10% of carbon and a balance of nickel.

3. The method according to claim 1, wherein the first filler additive comprises, by weight, about 0.55-2.75% of titanium+aluminum alloy, about 7.0-14% of cobalt, about 9.0-16% of chromium, about 10-20% of molybdenum, about 1.0-5.0% of iron, about 0.05-0.75% of aluminum, about 0.5-2.0% of titanium, less than or equal to about 0.8% of manganese, about 0.02-0.10% of carbon and a balance of nickel, the first filler additive being devoid of hafnium.

4. The method according to claim 1, wherein the easy-to-weld alloy comprises, by weight, about 11% chromium, about 11% cobalt, about 11% molybdenum, about 3.2% tungsten, about 1.8% aluminum, about 1% titanium and a balance of nickel.

5. The method according to claim 1, wherein the easy-to-weld alloy forming in the weld metal adjacent to the fusion line comprises gamma prime concentration similar to the second filler additive.

6. The method according to claim 1, wherein the initial heat-treating of the component comprises increasing temperature up to 2200° F., maintaining 2200° F. for two hours, decreasing temperature at a rate of 1° F./min until 1500° F., and vacuum-quenching.

7. The method according to claim 1, wherein post-weld heat-treating the treated component comprises post-weld heat treating the treated component in a vacuum furnace with clamping the component with compressive fixtures.

8. The method according to claim 1, wherein post-weld heat-treating the treated component comprises heat-treating the treated component under hot isostatic processing conditions.

9. The method according to claim 1, wherein post-weld heat-treating the treated component comprises solution heat treating the treated component.

10. The method according to claim 1, wherein the component is substantially crack-free after welding.

11. The method according to claim 1:
wherein the hard-to-weld base alloy comprises, by weight, about 9.3-9.7% tungsten, about 9-10% cobalt, about 8.0-8.7% chromium, about 5.25-5.75% aluminum, about 2.80-3.30% of tantalum, about 0.6-0.9% titanium, about 0.4-0.6% molybdenum, about 0-0.2% of iron, about 0.01-0.02% of boron, about 0.07-0.10% of carbon and a balance of nickel; and
wherein the initial heat-treating of the component comprises increasing temperature up to 2200° F., maintaining 2200° F. for two hours, decreasing temperature at a rate of 1° F./min until 1500° F., and vacuum-quenching.

12. The method according to claim 11, wherein the first filler additive comprises, by weight, about 0.55-2.75% of titanium+aluminum alloy, about 7.0-14% of cobalt, about 9.0-16% of chromium, about 10-20% of molybdenum, about 1.0-5.0% of iron, about 0.05-0.75% of aluminum, about 0.5-2.0% of titanium, less than or equal to about 0.8% of manganese, about 0.02-0.10% of carbon and a balance of nickel, the first filler additive being devoid of hafnium.

13. The method according to claim 12:
wherein the easy-to-weld alloy forming in the weld metal adjacent to the fusion line comprises gamma prime concentration similar to the second filler additive; and
wherein the easy-to-weld alloy comprises, by weight, about 11% chromium, about 11% cobalt, about 11% molybdenum, about 3.2% tungsten, about 1.8% aluminum, about 1% titanium and a balance of nickel.

14. The method according to claim 13, wherein post-weld heat-treating the treated component includes a technique selected from the group consisting of clamping the component with compressive fixtures in a vacuum furnace, hot isostatic processing, solution heat treating, and combinations thereof.

15. The method according to claim 14, wherein post-weld heat-treating the treated component includes clamping the component with compressive fixtures in a vacuum furnace.

16. The method according to claim 14, wherein post-weld heat-treating the treated component includes hot isostatic processing.

17. The method according to claim 14, wherein post-weld heat-treating the treated component includes solution heat treating.

18. A method of welding a component, the method comprising:
- an initial heat-treating of the component comprising a substrate, the substrate comprising a hard-to-weld base alloy comprising, by weight, about 9.3-9.7% tungsten, about 9-10% cobalt, about 8.0-8.7% chromium, about 5.25-5.75% aluminum, about 2.80-3.30% of tantalum, about 0.6-0.9% titanium, about 0.4-0.6% molybdenum, about 0-0.2% of iron, about 0.01-0.02% of boron, about 0.07-0.10% of carbon and a balance of nickel, the initial heat-treating forming substantially equiaxed gamma prime microstructure having an average gamma prime grain size greater than prior to the initial heat-treating;
- removing a portion of the substrate to form a treatment region comprising an exposed surface;
- buttering the exposed surface with a first filler additive comprising, by weight, about 0.55-2.75% of titanium+aluminum alloy, about 7.0-14% of cobalt, about 9.0-16% of chromium, about 10-20% of molybdenum, about 1.0-5.0% of iron, about 0.05-0.75% of aluminum, about 0.5-2.0% of titanium, less than or equal to about 0.8% of manganese, about 0.02-0.10% of carbon and a balance of nickel, the first filler additive being devoid of hafnium, to form a weld metal adjacent to a fusion line comprising an easy-to-weld alloy comprising, by weight, about 11% chromium, about 11% cobalt, about 11% molybdenum, about 3.2% tungsten, about 1.8% aluminum, about 1% titanium and a balance of nickel; and
- welding the component with the easy-to-weld alloy and a second filler additive to form a treated component, the second filler additive comprising, by weight:
  - about 1.0-2.0% tungsten, about 18.0-20.0% cobalt, about 20.0-22.0% chromium, about 2.0-3.0% aluminum, about 0.5-1.5% titanium, about 0.5-1.5% of molybdenum, about 0.03-0.18% carbon, about 3.0-6.0% niobium, up to about 0.15% of tantalum, up to about 0.20% of hafnium, up to about 0.20% of iron, and a balance of nickel; or
  - 1.8-2.2% tungsten, about 18.5-19.5% cobalt, about 22.2-22.8% chromium, about 1.6-1.8% aluminum, about 2.2-2.4% titanium, about 0.15% molybdenum, about 0.35% of iron, about 0.002-0.008% of boron, about 0.08-0.12% carbon, about 1.25-1.45% niobium and a balance of nickel;
- depositing a top layer including the first filler additive onto the second filler additive;
- post-weld heat-treating the treated component; and
- removing the top layer,
- wherein welding the hard-to-weld base alloy with the first filler additive forms the easy-to-weld alloy.

* * * * *